United States Patent [19]
Kanai

[11] Patent Number: 5,748,985
[45] Date of Patent: May 5, 1998

[54] CACHE CONTROL METHOD AND CACHE CONTROLLER

[75] Inventor: Sadasaburo Kanai, Kawasaki, Japan

[73] Assignee: Hitachi, Ltd., Tokyo, Japan

[21] Appl. No.: 76,856

[22] Filed: Jun. 15, 1993

[51] Int. Cl.$^6$ .................................................. G06F 12/00
[52] U.S. Cl. .................. 395/457; 395/183.18; 395/468
[58] Field of Search ............................... 395/400, 425, 395/575, 444, 445, 457, 488, 460, 462, 463, 468, 471, 470, 182.13, 182.17, 182.14, 183.18

[56] References Cited

U.S. PATENT DOCUMENTS

| | | | |
|---|---|---|---|
| 4,084,231 | 4/1978 | Capozzi et al. | 395/425 |
| 4,507,751 | 3/1985 | Gawlick et al. | 395/600 |
| 4,593,354 | 6/1986 | Ushiro | 395/425 |
| 4,916,605 | 4/1990 | Beardsley et al. | 395/425 |
| 5,327,556 | 7/1994 | Mohan et al. | 395/600 |
| 5,418,921 | 5/1995 | Cortney et al. | 395/441 |

FOREIGN PATENT DOCUMENTS

A-59-153251  9/1984  Japan.

OTHER PUBLICATIONS

Janssens et al, "Performance of Cache–Based Error Recovery in Multiprocessors", IEEE Trans on Par. & Dist. Sys, V5, N10, Oct. 1994 pp. 1033–1043.

Wu et al, "Error Recovery in Shared Memory Multiprocessors Using Private Caches", IEEE Trans on Par. & Dist. Sys., V1, N2, Apr. 1990 pp. 231–240.

*Primary Examiner*—Rebecca L. Rudolph
*Attorney, Agent, or Firm*—Antonelli, Terry, Stout & Kraus, LLP

[57] ABSTRACT

In a cache controller having a cache disposed between a CPU and a direct access storage for temporarily storing therein data transferred between the CPU and the storage, data is written from the cache into the storage in a write after mode. There is employed an update generation identifier specified by the CPU at each predetermined point of time. When storing data (write after data) from the cache into the storage in the write after mode, the last update generation specified prior to when the data is first written in the cache is set as the update generation of the data. When an update generation is specified by the CPU, write after data having a generation older than the specified generation by a predetermined effective management generation number n or more is preferentially written in the storage. When write after data is lost in the cache due to a failure during execution of a program, old data is read from the storage to execute again the program beginning from a point thereof corresponding to the oldest update generation of write after data, thereby recovering the lost write after data. Alternatively, the write after data is recovered by use of the update journals beginning from a point thereof associated with the oldest update generation.

16 Claims, 14 Drawing Sheets

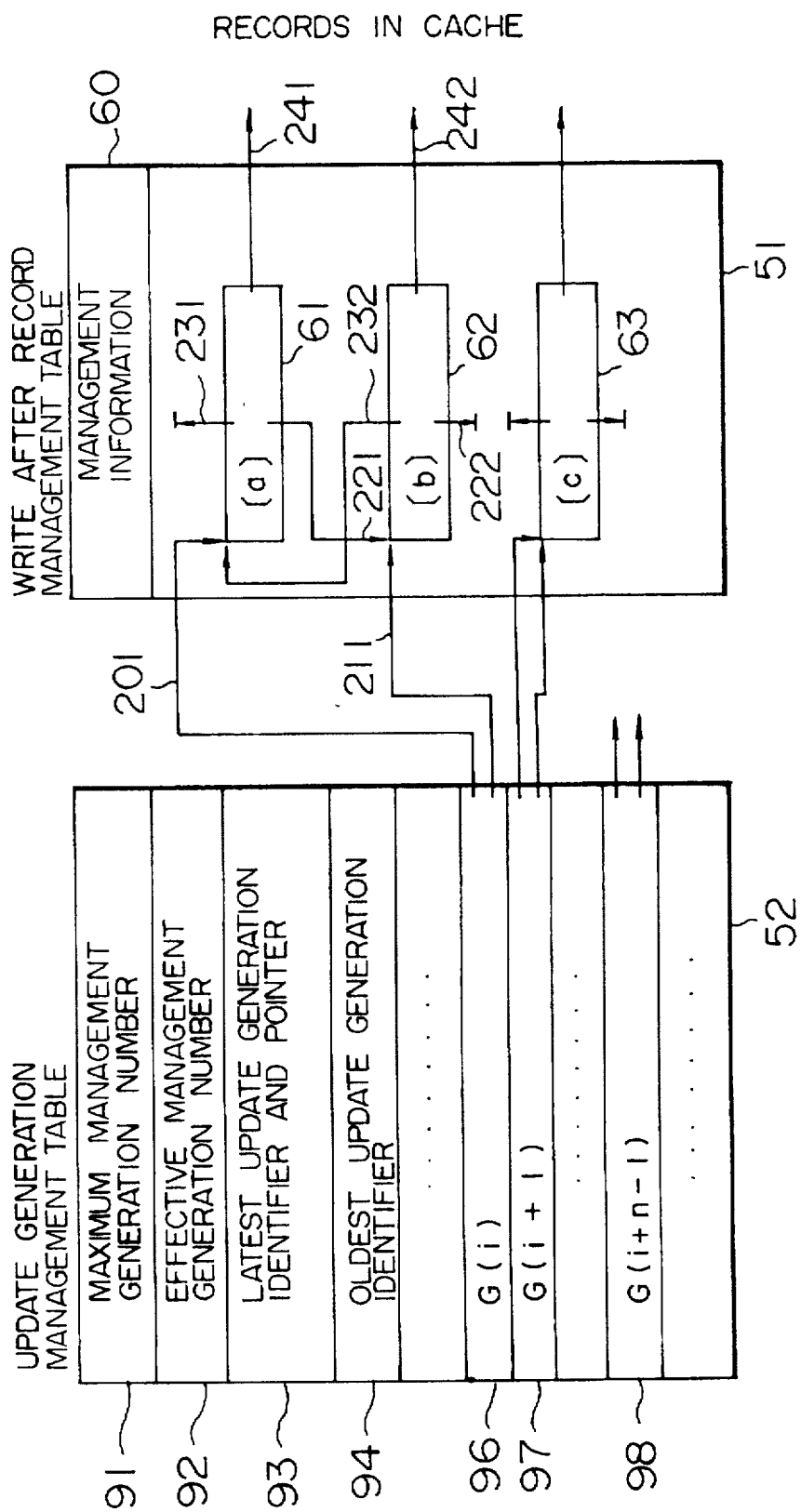

FIG. 3

ENTRY 61

| 111 | 112 | 113 | 114 |
|---|---|---|---|
| ADDRESS OF WRITE AFTER RECORD OR MAGNETIC DISK | POINTERS TO PRECEDING AND SUCCEEDING ENTRIES OF SAME UPDATE GENERATION | POINTER BETWEEN ENTRIES TO DETERMINE WRITE REQUENCE IN MAGNETIC DISK DEVICE | ADDRESS OF WRITE AFTER RECORD IN CACHE |

FIG. 4

ENTRY 96

| 121 | 122 | 123 |
|---|---|---|
| UPDATE GENERATION IDENTIFIER | NUMBER OF WRITE AFTER RECORDS OF SAME UPDATE GENERATION | POINTERS TO FIRST AND LAST ENTRIES OF PERTINENT GENERATION IN WRITE AFTER RECORD MANAGEMENT TABLE |

CACHE CONTROL METHOD AND CACHE CONTROLLER

BACKGROUND OF THE INVENTION

The present invention relates to a cache control method and a cache controller, and in particular, to a method of and an apparatus for controlling a cache in which a write-back mode or method is used to write data in a direct access storage device.

Ordinarily, in a general-purpose large-sized computer system, there is adopted a direct access storage device to store files therein. A magnetic disk unit or device is particularly favorable due to its capacity, performance, and the like. However, an access to a magnetic disk installed in the disk unit is accompanied by a mechanical operation and hence it is difficult to remarkably increase the access speed. As a result, the input/output processing of the magnetic disk unit is a bottleneck which hinders improvement of the overall performance of the computer system.

As technology to solve the problem, there has been introduced a disk cache.

That is, a cache configured of a semiconductor memory or the like is disposed between a central processing unit (CPU) and a magnetic disk unit such that a portion of the data in the disk unit is also stored in the cache. In response to an input request from the CPU side, an access is made to the cache to obtain data associated with the request so as to return the data to the CPU, thereby increasing efficiency of the input processing.

On the other hand, for an output request from the CPU, there is employed, for example, a write after mode or procedure. In this access method, when updated data received from the CPU side is written in the cache, completion of the write operation is notified to the CPU. Thereafter, the updated data is written in the magnetic disk device asynchronously with respect to the operation on the CPU side. Resultantly, this increases the effectiveness of the output processing.

However, according to the write-back accessing method, when a failure such as an interruption of the power source or an abnormality of the cache takes place during a period of time from when the write completion is reported to the CPU to the time when the updated data is completely written in the disk unit, the updated data is lost in the cache. Moreover, since the write completion has already been notified to the CPU, the updated data is not kept retained on the CPU side. To overcome this disadvantageous situation, a technology to recover the updated data is required.

In a case where, like in a database system, an update journal (or a log) is recorded in a journal file for each update of data, it is possible to recover according to the update journal the updated data thus lost during the operation. However, the updated data in the cache is written in the magnetic disk unit in an order different from the data update sequence, which implies that old updated data may possibly remain in the cache. In the worst case, data updated immediately after the system initiation may be kept in the cache. Consequently, it is impossible to identify a point in the journal file from which the update journal is to be used to recover the objective updated data. In consequence, even when the magnetic disk unit is normally accessible, the lost updated data is required to be recovered according to a backup file of the disk unit and update journals like in the case of an ordinary media failure. In consequence, a long period of time is necessary to recover the update data.

To overcome this difficulty, there can be considered a countermeasure in which the oldest updated data in the cache is identified on the cache side so as to notify the data to the CPU in an ordinary operation or at an occurrence of a failure. In this method, the system can limit a range of the update journals necessary for the recovery operation at a failure of the cache, thereby minimizing the period of time for the recovery of the data.

However, the range of update journals required for the data recovery depends on an access pattern to the database, and hence the recovery time may possibly be lengthened depending on certain situations. Namely, data repeatedly updated is kept in the cache. Consequently, at a cache failure for such data, a large volume of update journal data must be traced in reverse in the journal file to recover the data.

To solve the problem, as disclosed for example JP-A-59-153251, there has been known a method in which all updated data of the disk cache is written in the magnetic disk unit when a logical processing unit such as a program is completed. This method, however, is attended with a problem of a time period for overhead processing to process the data in the disk unit, which leads to deterioration of system performance.

SUMMARY OF THE INVENTION

It is therefore an object of the present invention to provide a cache control method and a cache controller for use in a computer system in which updated data is written in a direct access storage device from a cache according to a write-back mode, wherein updated data lost at an occurrence of a cache failure is recovered in a short period of time and the overhead for the recovery is minimized.

According to a first aspect of the present invention, there is provided a cache control method for use in a computer system including a CPU, a direct access storage device, and a cache disposed between the CPU and the storage device to temporarily store therein data transferred therebetween, wherein updated data is written in a direct access storage device from a cache according to a write-back mode. In the cache control method, for a program on the CPU side to write updated data in the storage device, there are disposed a checkpoint at a plurality of points in the execution process thereof such that a write-back data update generation is assigned to each of the checkpoints. A write-back data update generation already specified at the latest checkpoint prior to a first write point of time when updated data (write-back data) to be written in the storage device from the cache in the write after method is first written in the cache is assigned as an update generation of the write-back data. The write after data is controlled according to the update generation.

According to a second aspect of the present invention, there is provided a cache control method in which when write-back data is lost in the cache due to a failure in the cache control method according to the first aspect, control is recovered to a point of the program related to a checkpoint associated with the update generation of the oldest write-back data so as to execute again the program, thereby recovering the write-back data. Alternatively, the update journals are used again beginning from a point associated with a checkpoint corresponding to the update generation of the oldest write after data so as to recover the objective data.

According to a third aspect of the present invention, there is provided a cache control method wherein in the cache control method above, the cache includes a volatile cache formed of a volatile memory and a non-volatile cache constituted of a non-volatile memory.

According to a fourth aspect of the present invention, there is provided a cache controller for achieving the cache control methods above.

In accordance with the present invention, write after data which is lost can be recovered in a short period of time. That is, the overall program is not required to be executed again. The program is re-executed beginning only from a checkpoint related to the pertinent update generation, which reduces the recovery time. Moreover, the update journal need only be limitatively checked beginning from the checkpoint associated with the update generation, thereby decreasing the period of time for the data recovery.

In addition, write after data is controlled according to the update generation. At a check point, accordingly, write-back data having an older update generation need only be written in the direct access storage device and hence the overhead time is minimized. In short, the write-back data of the older update generation has a high possibility of being written in the storage device in the ordinary write-back processing and hence such data is rarely required to be written in the device at the checkpoint, which reduces the overhead time.

Furthermore, in a case where the cache includes a volatile cache and a non-volatile cache so as to store write-back data in the non-volatile cache from the volatile cache, it is possible to increase the possibility of the case in which write-back data is lost only in the volatile cache. This consequently decreases the number of update generations to be traced in the reverse direction for the data recovery, thereby minimizing the recovery time.

Moreover, the cache controller according to the present invention implements the cache control methods so as to carry out the operations above.

BRIEF DESCRIPTION OF THE DRAWINGS

These and other objects and advantages of the present invention will become apparent by reference to the following description and accompanying drawings wherein:

FIG. 2 is a diagram showing the constitution of a write-back record management table and an update generation management table in the first embodiment;

FIG. 3 is a diagram showing the configuration of entries in the write-back record management table of FIG. 2;

FIG. 4 is a diagram showing the configuration of entries in the update generation management table of FIG. 2;

DESCRIPTION OF THE PREFERRED EMBODIMENTS

Referring now to the accompanying drawings, description will be given in detail of favorable embodiments according to the present invention.

Figure 1:
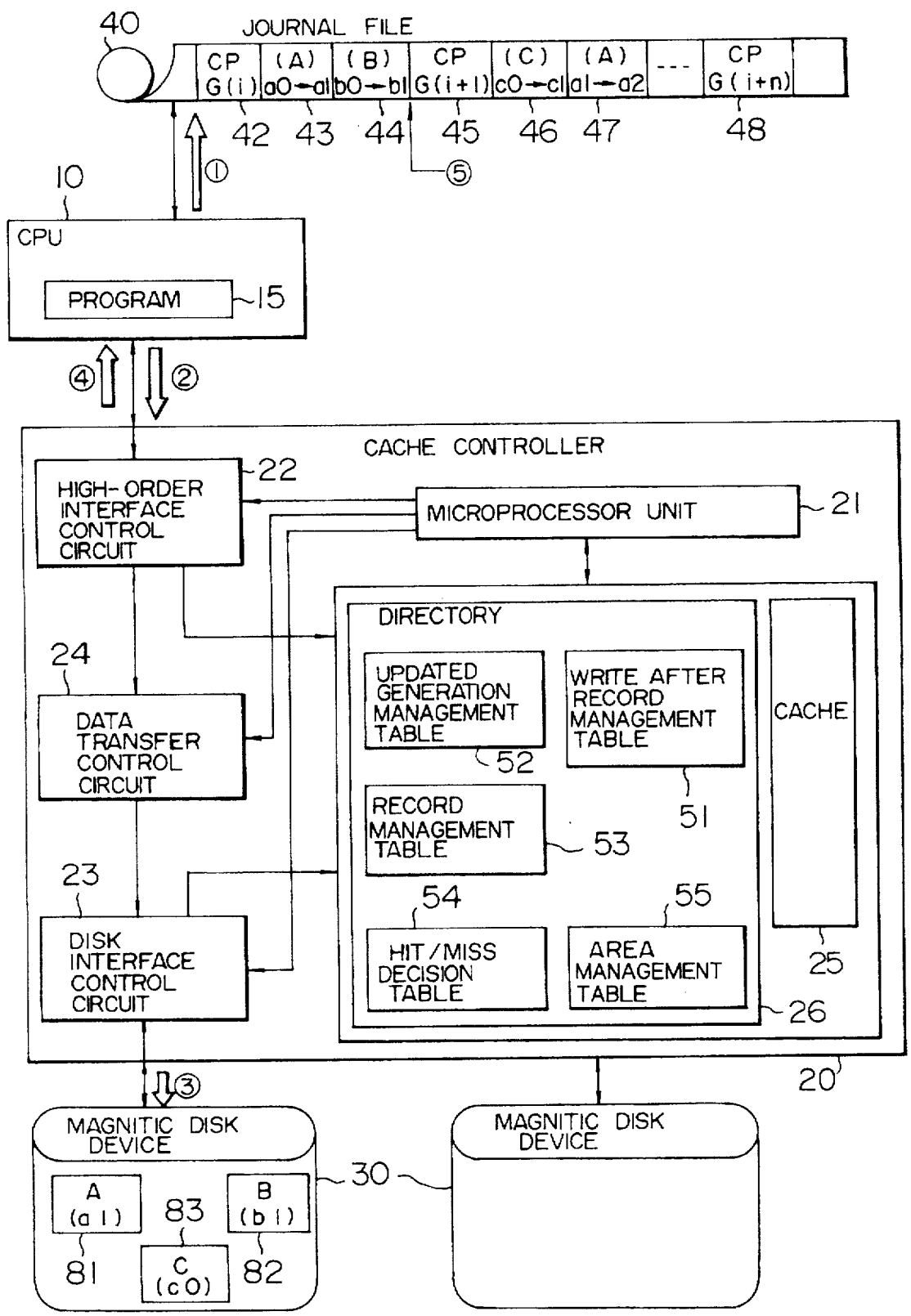
FIG. 1 is a block diagram showing the configuration of a cache controller in a first embodiment according to the present invention.

FIG. 1 shows the operation of a cache controller 20 in the first embodiment of the present invention.

The controller 20 is connected between a central processing unit (CPU) 10 and a magnetic disk device 30.

In the controller 20, there are arranged a microprocessor unit 21, a high-order interface control circuit 22, a disk interface control circuit 23, a data transfer control circuit 24, a cache 25, and a directory 26.

The high-order interface control circuit 22 is connected to the CPU 10 to control communication of data and commands between the CPU 10 and the cache controller 20.

The disk interface control circuit 23 is linked with the disk device 30 to supervise transfers of data and commands between the cache controller 20 and the disk device 30.

The data transfer control circuit 24 is connected to the high-order interface control circuit 22 and the disk interface control circuit 23 to control communications of data therebetween.

The cache 25 is linked between the controllers 22 and 23 and stores therein a portion of data stored in the disk device 30. Moreover, data written in the device 30 according to the write-back mode is stored in the cache 25. In this regard, according to this embodiment, data is managed in the unit of (physical) records in the cache 25. Consequently, data written in the device 30 according to the write-back mode is called a write-back record. The present invention is however not restricted by the embodiment. For example, data may be managed in the unit of tracks in the cache 25.

In the directory 26, there is stored information to manage data and areas in the cache 25. Namely, disposed therein are a write-back record management table 51, an update generation management table 52, a record management table 53, a hit/miss decision table 54, and an area management table 55.

In this connection, the memory device of the directory 26 of the embodiment is a non-volatile memory or a semiconductor memory employing a battery so that the contents of the directory 26 is kept remaining even when power of the cache controller 20 is interrupted.

The management table 51 is used to manage write after records in the cache 25. In the table 51, there are disposed, for example as shown in FIG. 2, an area to store therein management information 60 and entries 61, etc. to store therein such items for each write-back record as an address thereof in the magnetic disk device 30 and an address thereof in the cache 25.

The control information 60 includes items such as the total number of the entries and free area information of the table 51.

In the entry 61 of the table 51, there are stored, as shown in FIG. 3, an address 111 in the disk device 30 of a write-back record (a) to be managed according to the entry 61, a bidirectional generation chain pointer 112 to chain the pertinent write-back record to other write-back records having the same update generation, a bidirectional group chain pointer 113 to establish chains between write-back records classified into an identical group because positions thereof are adjacent to each other in the disk device 30, and an address 114 of an area of the cache 25 where the write-back record (a) to be managed according to the entry 61 is stored in the cache 25. This is also the case of the other entries 62, 63, etc.

In this connection, the table 51 may be disposed in the cache 25.

The update generation management table 52 is configured of a maximum management generation number 91, an effective management generation number 92, a latest update generation identifier and pointer 93, an oldest update generation identifier 94, and entries 96, 97, etc. including an update generation identifier to manage each update generation.

The maximum management generation number 91 is the largest value of update generation manageable by the table 52. The effective management generation number 92 denotes the number of update generation actually supervised by the table 52. The identifier and pointer 93 indicates the latest update generation identifier at the current point and the pointer designating an entry in which the latest identifier is stored. The oldest update generation identifier 94 designates an identifier of the oldest update generation at the point of time.

In the entry 96 managing update generations, there are stored as shown in FIG. 4 an update generation identifier 121 of an update generation G(i) managed by this entry, a number of write-back records 122 of the update generation, and a pointer 123 including pointers to the first and last entries related to the update generation. The record layout is also the same for the other entries 97, 98, etc.

Referring again to FIG. 1, the record management table 53 is disposed to supervise records stored in the cache 25. The table 53 includes for each record such entries as an address (pointer) thereof in the cache 25, an address thereof in the disk device 30, information denoting whether or not the pertinent record is a write-back record, and a field of chain pointers between entries to determine a sequence of removing the pertinent record from the cache 25.

The hit/miss decision table 54 is used to decide whether or not any selected one of the records in the disk device 30 exists in the cache 25.

The area management table 55 is disposed to manage usage states of areas in the cache 25. When the management unit of the disk device 30 is a fixed-length record, the area of the cache 25 is subdivided into fixed-length sub-areas, thereby managing the state of each sub-area or area for use thereof. Moreover, when the records are in a variable-length count-key-data format, the system manages each used area and the first address and the length of each free area. In addition, when the area of the disk device 30 is supervised in the track units, the overall area of cache 25 is split into fixed-length areas so as to manage the obtained areas for utilization thereof.

In this regard, the tables 53 to 55 are basically the same as those adopted in the known cache controller of the prior art.

In the CPU 10, there is stored a program 15, which includes an online data base program, an update journal record program, a cache failure recovery subprogram, and the like.

Operations of the program 15 will now be briefly described.

In a process to execute the online database program to update a record written in the disk device 30, the CPU 10 records the update journals 43, 44, 45, 46, 47, etc. in a journal file 40. The journal 43 contains, for example, information related to update the contents of the record A 81 from (a0) to (a1). The journal file 40 is incidentally kept in a storage such as a magnetic disk, a magnetic tape, or the like.

During execution of the database program, there are disposed a plurality of checkpoints. The checkpoints are set, for example, at a fixed interval time or each time a predetermined number of data update operations are accomplished. These points are supervised according to checkpoint (CP) identifiers. In this embodiment, the CP identifier is designated by, for example, a two-byte integer ranging from 0 to 65535. The value is assigned in a cyclic manner.

At a checkpoint, the CPU 10 writes CP journals 42, 45, 48, etc. in the journal file 40. For example, as indicated by an arrow ① in FIG. 1, the CP journal 48 is written in the file 40 at a checkpoint having a CP identifier G(i+n). In addition, the CPU 10 supplies the cache controller 20 with a CP command containing the CP identifier as a parameter. For example, as denoted by an arrow ② in the diagram, a CP command associated with a CP identifier G(i+n) is issued to the controller 20 at a checkpoint of the CP identifier G(i+n).

On receiving the CP command at the checkpoint, the controller 20 stores the CP identifier of the CP command as the latest update generation identifier in an entry field of the update generation management table 52. When updating data, the controller 20 registers an entry related to a generated write-back record to the write-back record management table 51. Moreover, according to information associated with the record, the controller 20 updates an entry corresponding to the latest update generation in the table 52. Resultantly, the write-back records are managed for each update generation.

In this connection, even when a write-back record supervised according to an update generation is updated again in association with another update generation later, the record is still managed by the original update generation. For example, in a case where a write-back record A is managed by an update generation G(i) in relation to the update journal 43, even when the record A is again updated according to an update generation G(i+1) for the journal 47, the record A is kept supervised by the generation (i), not by the generation G(i+1).

Furthermore, on receiving a CP command, the cache controller 20 conducts a record retrieval for a write-back record of an update generation G(x−n) which is advanced in time by n generations relative to an update generation G(x) related to the CP command. If the record is obtained, the controller 20 writes the record in the disk device 30. For example, when the CP identifier of the received CP command is G(i+n), an attempt is made to retrieve a write-back record of an update generation G(i). If the retrieval is successful, the attained record is written in the disk device 30 (as indicated by an arrow ③ in FIG. 1). Thereafter, G(i+1) is stored as the oldest update generation identifier 94.

In this regard, the possibility of whether the record is written by the operation above or by an ordinary write-back control depends on the setting value of n. The value n is specified by the CPU 10 in an operation to set a usage mode of the cache 25 when execution of the online database program is commenced.

In a case where a failure such as interruption of power occurs and a write-back record in the cache 25 is lost, the controller 20 supplies the CPU 10 with a report including failure information such as the failure occurrence and a range influenced by the failure as well as the oldest update generation identifier 94 stored in the table 52 (as denoted by an arrow ④ in FIG. 1).

The CPU 10 interrupts, on receiving the report, the execution of the database program and then initiates the cache failure recovery sub-program. According to the recovery program, the CPU 10 accesses the journal file 40 to read update journal data beginning from a CP journal associated with the oldest update generation identifier 94 so as to recover the write-back record according to records in the disk device 30 (as designated by an arrow ⑤ ). For example, if the identifier 94 is assigned with G(i+1), the update journals 46, 47, etc. are sequentially read from the journal file 40 beginning from the CP journal 45. Moreover, for the update journal 46, the contents of the record C are changed from (c0) to (c1) in the disk device 30. For the journal 47, the contents of the record A 81 are altered from (a1) to (a2) in the device 30.

As above, the system achieves an n-generation trace operation in the reverse direction through the journal file 40, thereby recovering the write-back record lost in the cache 25.

Subsequently, a detailed description will be given of (1) operation at initialization of cache controller, (2) operation at initiation of execution of online database program, (3) operation to update data, (4) operation in write after processing, (5) operation at checkpoint, and (6) operation at cache failure.

(1) Operation at initialization of cache control

The operation is carried out ① at installation of the cache controller 20 or the disk device 30, ② when the capacity of cache 25 is increased in the cache controller 20, or ③ when the cache controller is powered.

Figure 5:
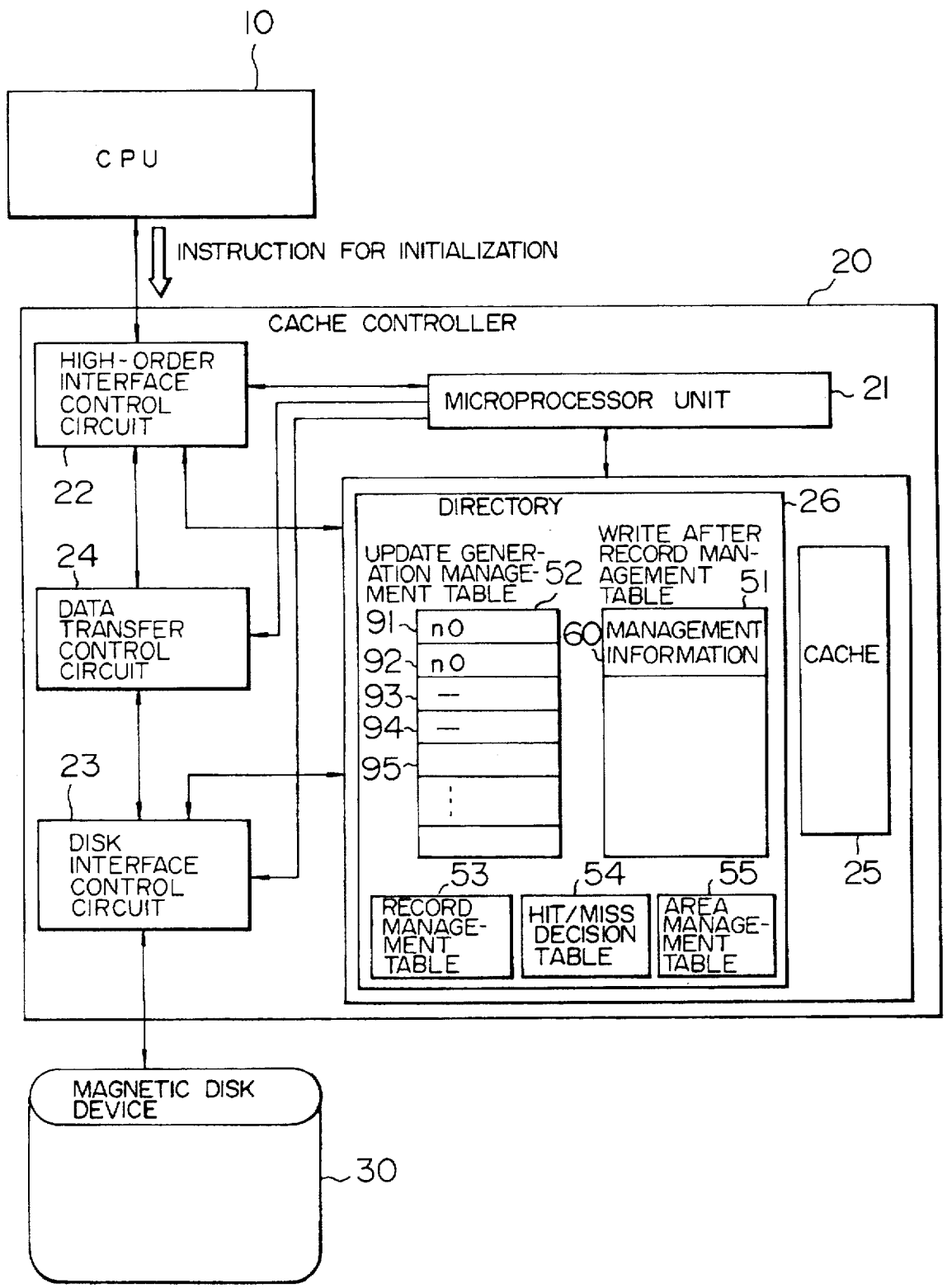
FIG. 5 is a diagram for explaining the outline of operation to initialize the cache controller.

FIG. 5 is a diagram for explaining an outline of operation achieved when the cache controller 20 is initialized.

The CPU 10 transmits an instruction for initialization to the high-order interface control circuit 22 of the cache controller 20. The interface control circuit 22 in turn transfers the instruction to the microprocessor unit 21.

The unit 21 initializes, in response to the instruction, various tables in the directory 26. In this connection, initializing operations of the tables 51 and 52 are related to the present invention.

(a) Initialization of write after record management table 51

According to the capacity of the cache 25 indicated by information of the initialization instruction, necessary areas are reserved for the table 51 in the directory 26. Thereafter, management information including the size and the usage state is initialized for each area.

(b) Initialization of update generation management table 52

Depending on the maximum management generation number "n0" of write-back records contained in the information of the initializing instruction, areas required for the table 52 are reserved in the directory 26. In the table 52, thereafter, the value n0 is set to the maximum management generation number 91 and the effective management generation number 92. Moreover, a null value is set to the latest update generation identifier and pointer 93 and the oldest update generation identifier 94.

(2) Operation at initiation of execution of online database program

Figure 6:
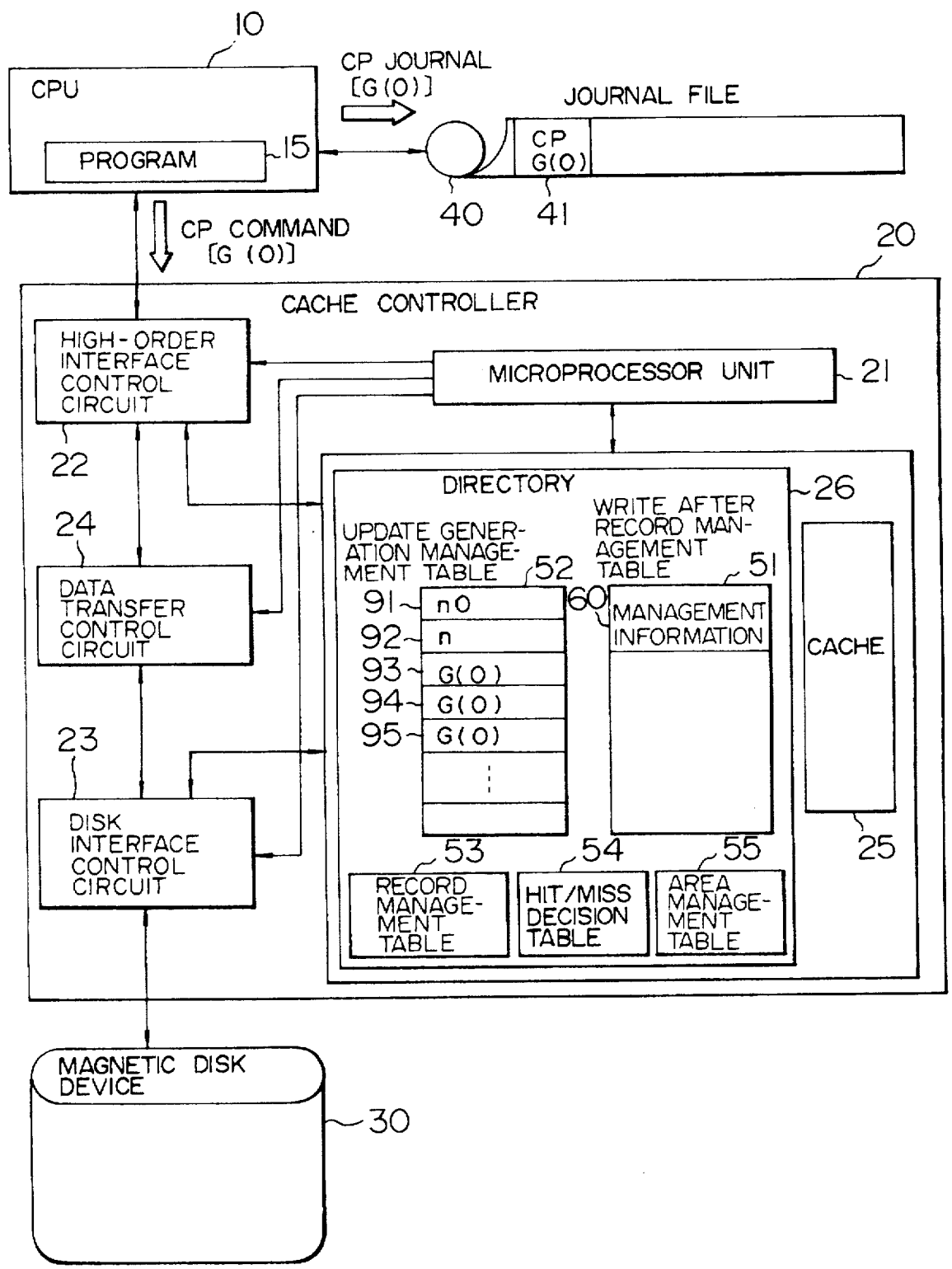
FIG. 6 is a diagram useful to explain the outline of operation to start execution of an on-line database program.

FIG. 6 is an explanatory diagram showing an outline of operation achieved when the database program is started for execution thereof.

The CPU 10 supplies, at initiation of execution of the program, the high-order interface control circuit 22 of the cache controller 20, with a CP command containing a CP identifier specified with a special value G(0) for initialization. The CP command specified for initialization contains such items as the control generation number "n" necessary to manage update generations of write after records. The value n is selected to be an appropriate value not exceeding the maximum value n0 according to the operation mode of the online database program. Furthermore, the CPU 10 records the CP journal 41 related to the CP identifier G(0) in the journal file 40.

The control circuit 22 transfers the CP command to the microprocessor unit 21. Receiving the command, the microprocessor 21 determines according to the CP identifier G(0) that the received command is specified for initialization so as to achieve the following operations (a) to (d) for the table 52 in the directory 26.

(a) Setting effective management generation number 92 A value "n" is set to the number 92.

(b) Setting entry 95 for update generation G(0)

The update generation identifier G(0) is set to the entry 95, and various management information items are accordingly set.

(c) Setting latest update generation identifier and pointer 93

G(0) is set as the latest update generation identifier to the field 93. In addition, a pointer to the entry 95 is also set thereto.

(d) Setting oldest update generation identifier 94

G(0) is set as the oldest update generation identifier 94.

(3) Operation to update data

Figure 7:
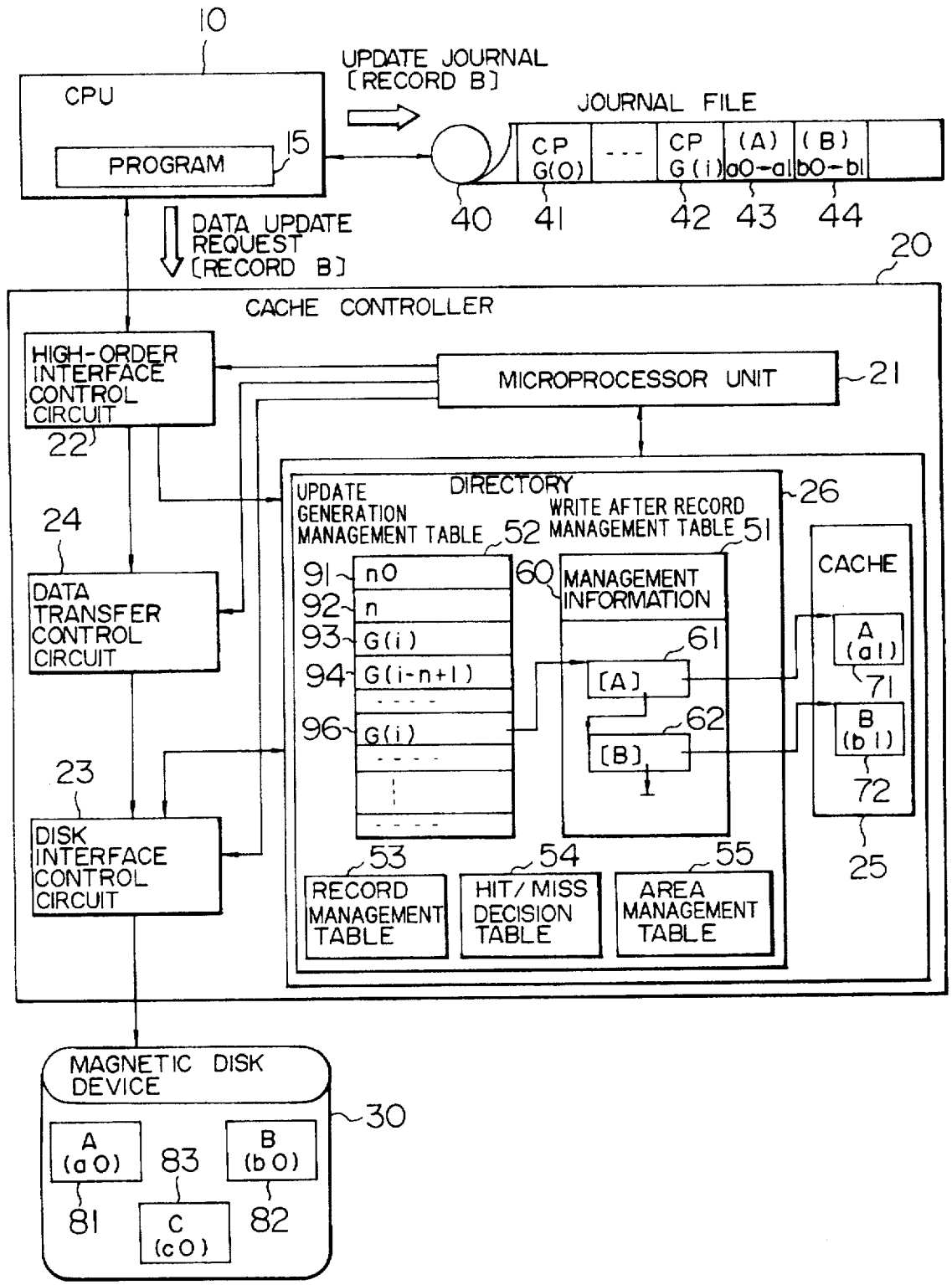
FIG. 7 is a diagram for explaining the outline of operation to update data.

FIG. 7 is an explanatory diagram showing an outline of operation to update data.

In the execution process of the program 15, when updating a record in the disk device 30, the CPU 10 records update journals in the journal file 40 and then issues a data update request to the cache controller 20. For example, to update a record B, an update journal 44 of the record B is written in the file 40 and then a request to update the record B is sent to the cache controller 20. In this regard, to minimize the amount of data of the update journal, only an after image and a before image of a portion of the pertinent record actually updated are recorded in the journal. Namely, the system does not record the overall record therein.

Figure 8:
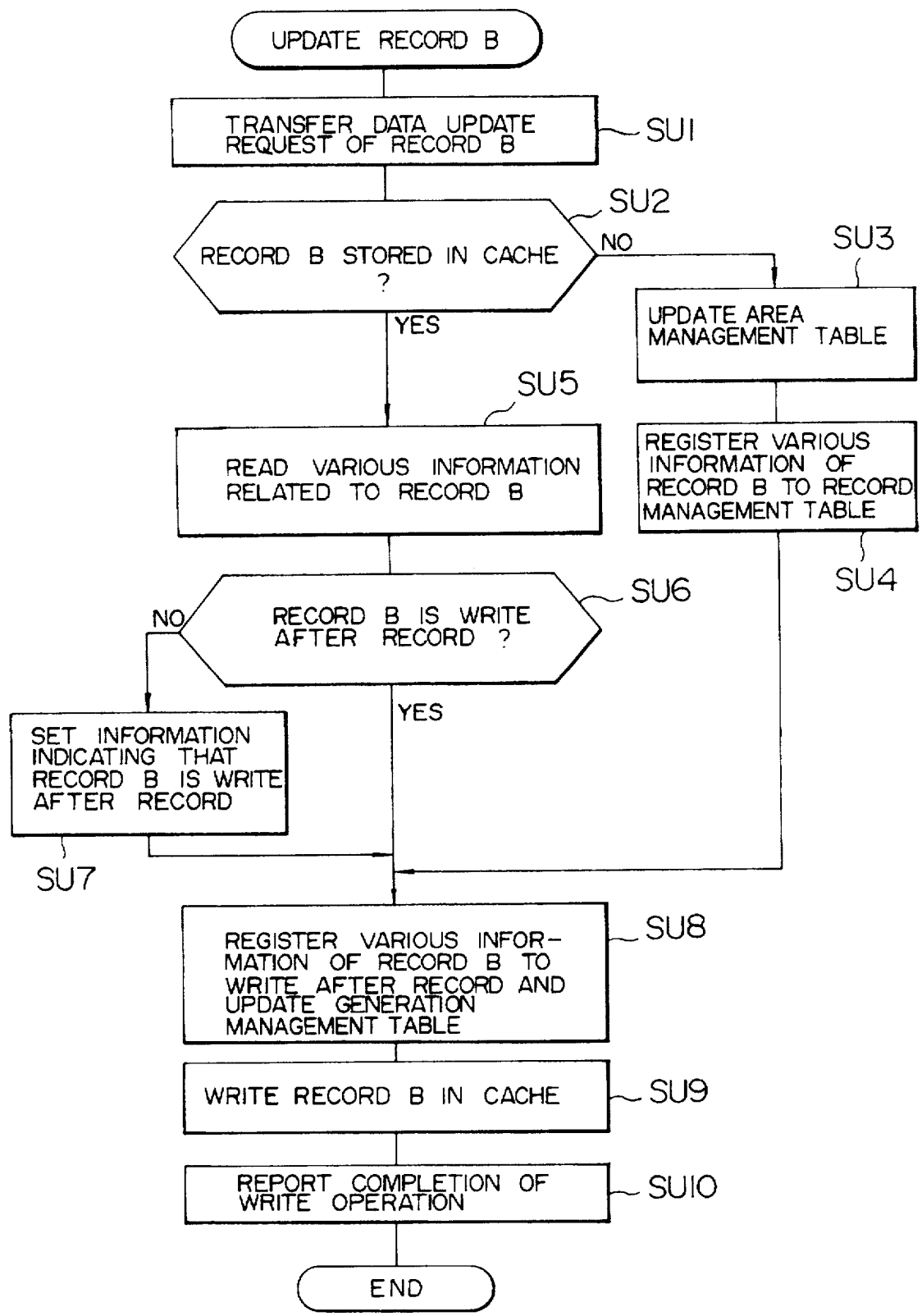
FIG. 8 is a flowchart showing the operation of data update processing.

Operation of the cache controller 20 at reception of the data update request from the CPU 10 will now be described according to the flowchart of FIG. 8 by reference to an example of a data update request of the record B. The latest update generation identifier is incidentally assumed as G(i).

In a step SU1, the controller 22 transfers to the microprocessor 21 the data update request of the record B received from the CPU 10.

In a step SU2, the microprocessor 21 references the hit/miss decision table 54 to determine whether or not the record B is beforehand stored in the cache 25. If the record B is missing therein, control is passed to a step SU3; otherwise, the processing proceeds to a step SU5.

In the step SU3, the microprocessor 21 references the area management table 55 to obtain a free area in the cache 25 to store therein the record B. The unit 21 updates the table 55, namely, indication of the free area is changed to a reserved area indication and thereafter the storage area 72 is reserved for the record B.

In a step SU4, an entry is produced for the record B in the table 53 and then there are stored in the entry various information items such as an address of the record in the cache 25, an address thereof in the disk device 30, information of indication of a write after record, and chain pointers between entries to decide a sequence to remove the record from the cache 25. Control is then transferred to a step SU8.

In the step SU5, the microprocessor unit 21 references the table 53 to read therefrom various information items related to the record B.

In a step SU6, judgement is conducted to determine whether or not the record B is a write-back record. If this is the case, control is passed to the step SU8; otherwise, control is transferred to a step SU7.

In the step SU7, information of indication of a write after record is registered in the entry of the record B in the table 53.

In the step SU8, the microprocessor 21 carries out processing I to IV to register various information items of the record B to the tables 51 and 52. Processing I: An entry 62 related to the record B is created in the table 51 so as to set therein an address of the record in the disk device 30, an address of the storage area 72 in the cache 25, and a group chain pointer. Moreover, the contents of management information 60 are updated.

Processing II: Referencing the latest generation identifier and pointer 93 of the table 52, there is attained the latest update generation G(i).

Processing III: The microprocessor 21 references the entry 96 related to the update generation identifier G(i) of the table 52, increments by one the number of write after records 122 of the pertinent update generation, and then updates the pointer 123 to the last entry of the table 51 (to point the entry 62).

Processing IV: The entry 62 of the record B is chained as the last item in the chained entries of the write after record related to the update generation G(i) in the table 51. In the example of FIG. 7, the update is achieved such that the pointer to an the immediately succeeding entry in the generation chain pointer 112 of the entry 61 of the record A points the entry 62 of the record B. Moreover, the pointer to the immediately preceding entry in the generation chain pointer 112 of the entry 62 of the record B points the entry 61 of the record A. In this connection, a null value is set to the pointer to the immediately succeeding entry in the generation chain pointer 112 of the entry 61 of the record A and to the pointer to the immediately succeeding entry in the generation chain pointer 112 of the entry 62 of the record B. In FIG. 7 and subsequent drawings, for simplification of the configuration thereof, only the forward-directional pointers are indicated by arrows in the chains, namely, arrows designating the reverse-directional pointers are not shown.

In a step SU9, the microprocessor 21 invokes the control circuit 22 to transfer the record B to be written in the area 72 of the cache 25.

In a step SU10, on receiving a write completion report from the microprocessor 21, the control circuit 22 notifies the completion of the write operation to the CPU 10.

(4) Operation of write after processing

The cache controller 20 writes, in an asynchronous manner with respect to the data update request from the CPU 10, the write-back record stored in the cache 25 in the magnetic disk device 30 during a period of time in which the disk device 30 is not conducting any other input/output operation. In this processing, by reference to the management information 60 in the table 51 and the group chain pointer of the entries, a write operation of the record is achieved in the disk device 30 such that write-back records adjacent to each other in the device 30 are written at a time.

After the write-back record is thus stored in the device 30, the unit 21 updates various tables in the directory 26.

That is, in the entries related to the record in the table 52, there is set an indication that the record is other than a write-back record. Moreover, the entries related to the record are deleted from the tables 51 and 52.

Whether or not the pertinent record is to be deleted from the cache 25 is determined according to the cache control algorithm commonly used.

(5) Operation at checkpoint

Figure 9:
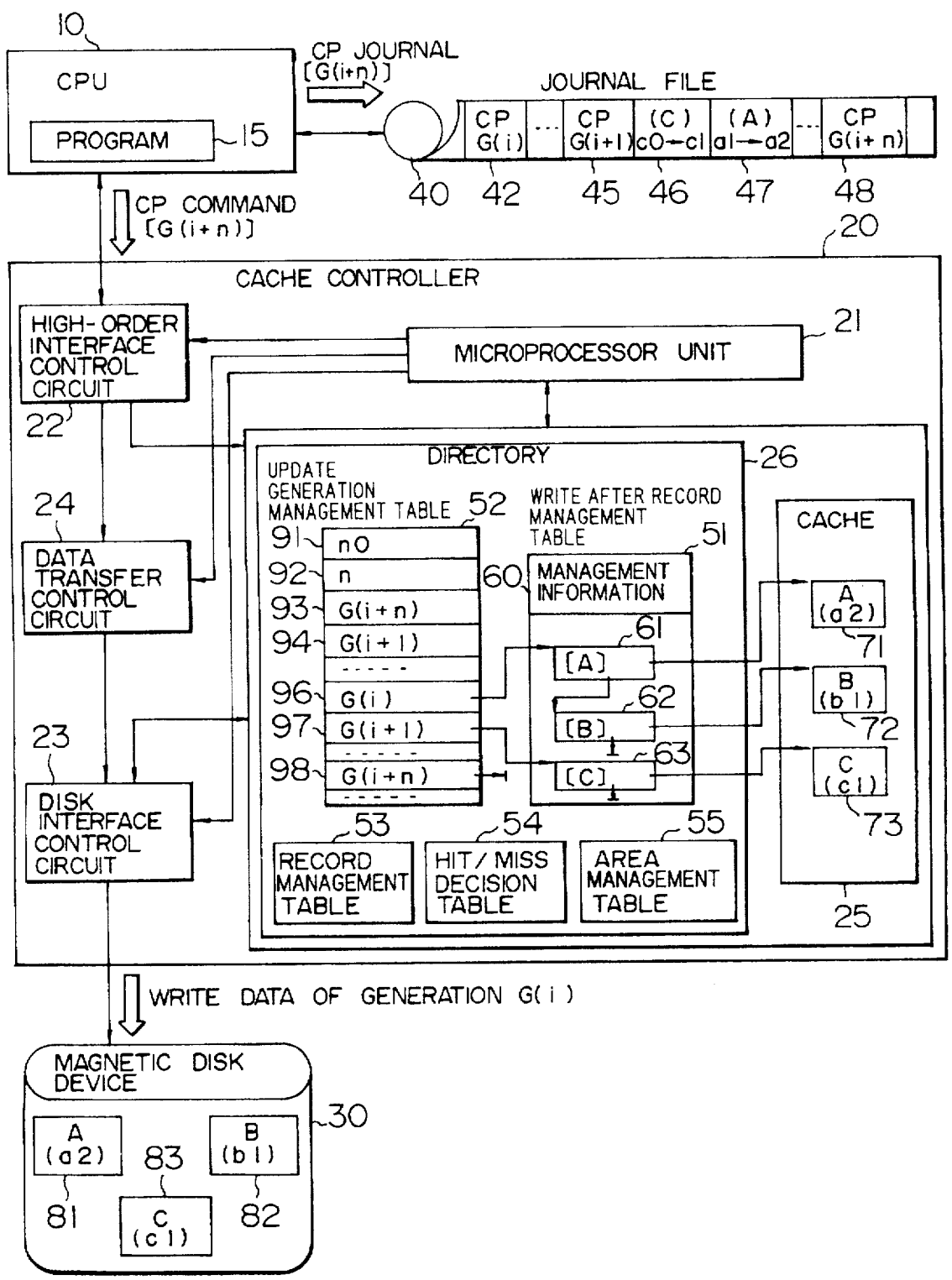
FIG. 9 is a diagram useful to explain the outline of operation at a checkpoint.

FIG. 9 is an explanatory diagram showing an outline of operation at a checkpoint.

The CPU 10 issues a CP command to the cache controller 20 at a checkpoint in an execution process of the program 15. In addition, a CP journal is recorded in the journal file 40. For example, when control reaches a checkpoint of the CP identifier G(i+n), the CPU 10 issues a CP command having the CP identifier G(i+n) to the controller 20 and records the CP journal 48 in the journal file 40.

Figure 10:
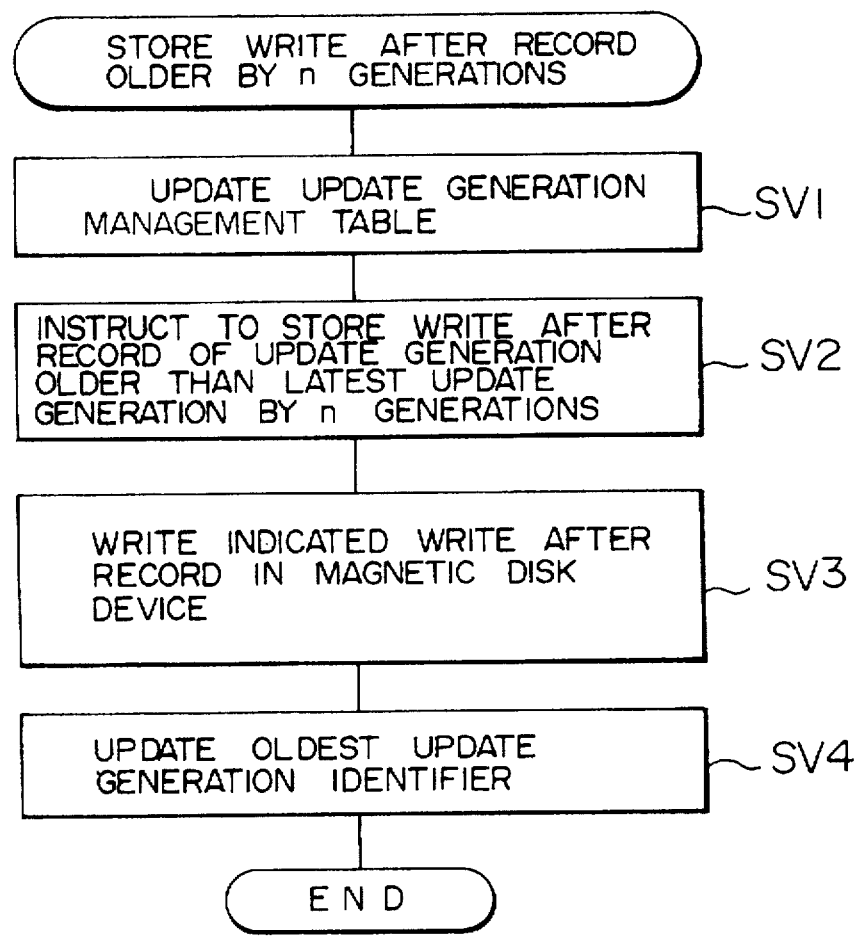
FIG. 10 is a flowchart of the operation to store write-back data advanced in time by n generations in the first embodiment.

Operation of the controller 20 at reception of a CP command from the CPU 10 will next be described according to the flowchart of FIG. 10 by reference to an example of a CP command having a CP identifier G(i+n).

In a step SV1, the control circuit 22 transfers the CP command of the CP identifier G(i+n) from the CPU 10 to the microprocessor 21.

The microprocessor 21 updates the table 52 in the directory 26 to set the CP identifier G(i+n) as the latest generation identifier. Namely, an entry 98 of the update generation G(i+n) is registered to follow an entry of the update generation G(i+n−1). Moreover, as the latest update generation identifier and pointer 93, G(i+n) and a pointer to the entry 98 are set. The entries in the table 52 are cyclically used. Namely, after the last entry is used in the table 52, the processing is executed again beginning from the first entry thereof.

In a step SV2, the unit 21 references the effective control generation number 92 in the table 52 to obtain a value "n" and then instructs the disk interface control circuit 23 to conduct a write operation of write after records A and B having an update generation G(i) advanced in time by n generations relative to the latest update generation G(i+n) from the cache 25 to the magnetic disk device 30.

In a step SV3, the control circuit 23 achieves a write operation of the indicated records A and B from the cache 25 to the disk device 30.

During an execution of the write processing of the records A and B in the disk device 30, when a new input/output request to the device 30 is received from the CPU 10, the microprocessor 21 checks to decide whether or not interruption of the write processing of the write-back record is inhibited by the CP command of the CP identifier G(i+n). If the interruption is inhibited, the input/output request is set to a wait state so as to complete the write operation of the records A and B. Otherwise, the current write operation is conducted in the disk device 30 up to a write-back record in the track related to the write-back record being currently processed, thereby interrupting the write operation of write-back record in the device 30. The new input/output request received from the CPU 10 is then processed. Thereafter, the interrupted write operation of the records A and B is restarted in the disk device 30.

When the write operation of the records A and B is completed in the disk device 30, control is passed to a step SV4.

In the description, the interruption and restart of the write operation of the records in the device 30 are achieved in track units, it is also possible to conduct the interruption and restart in cylinder units.

In the step SV4, the unit 21 sets the oldest update generation identifier 94, namely, the next update generation G(i+1) is set in place of the update generation G(i). In this regard, the microprocessor 21 may reference the table 52 such that when a write-back record of the update generation G(i+1) is missing in the cache 25, G(i+2) is set to the identifier 94. Namely, the oldest update generation identifier of the write-back records in the cache 25 is set to the identifier 94.

In this connection, the CPU 10 can temporarily alter, only for the pertinent checkpoint, the effective management generation number 92 of the table 52 according to parameters contained in the CP command. For example, in a case where the number 92 in the table 52 is changed to "0" by a parameter of a CP command, all write after records of the cache 25 are written in the disk device 30.

(6) Operation at cache failure

Figure 11:
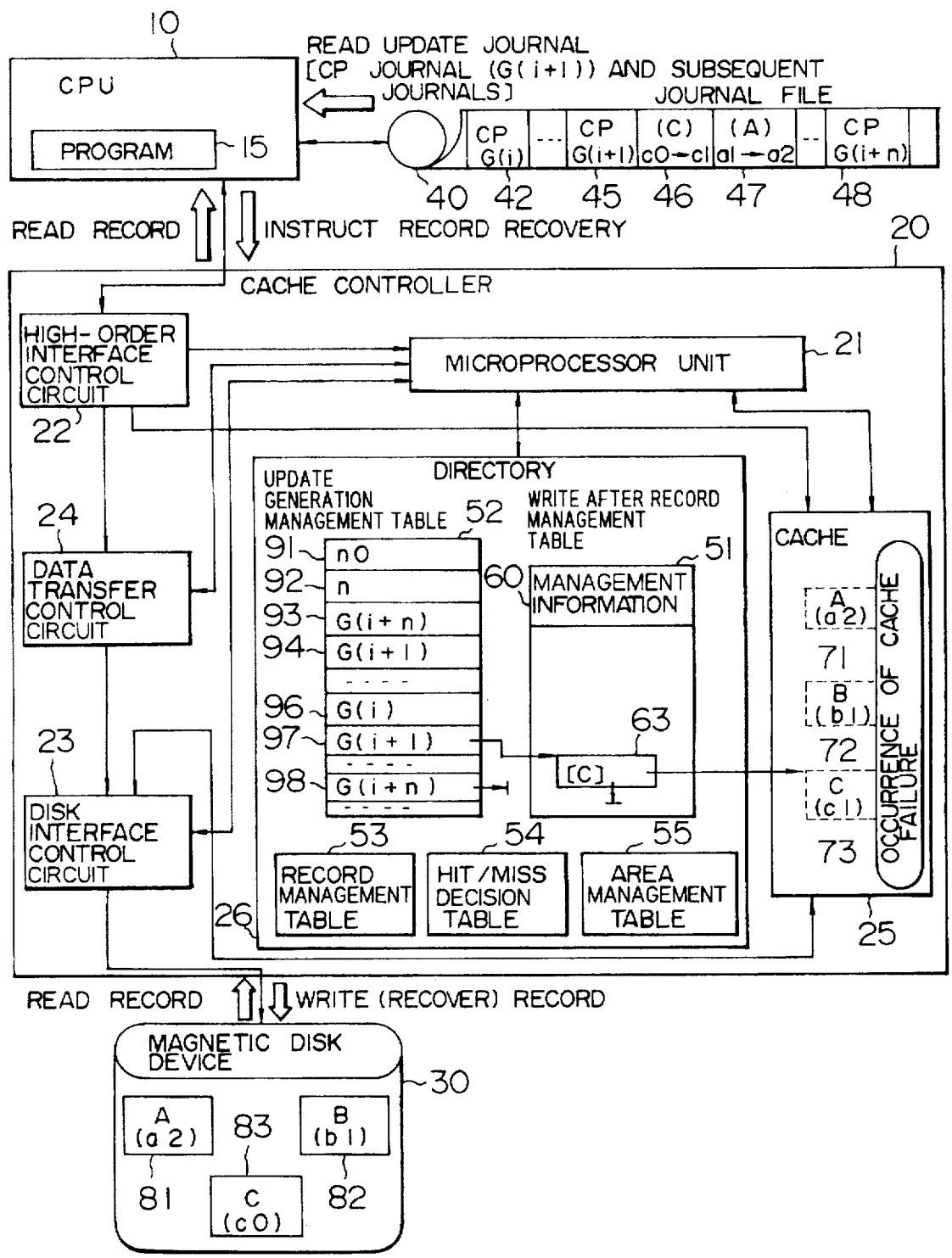
FIG. 11 is a diagram for explaining the outline of the operation at a cache failure.

FIG. 11 is an explanatory diagram showing an outline of operation at a cache failure.

Figure 12:
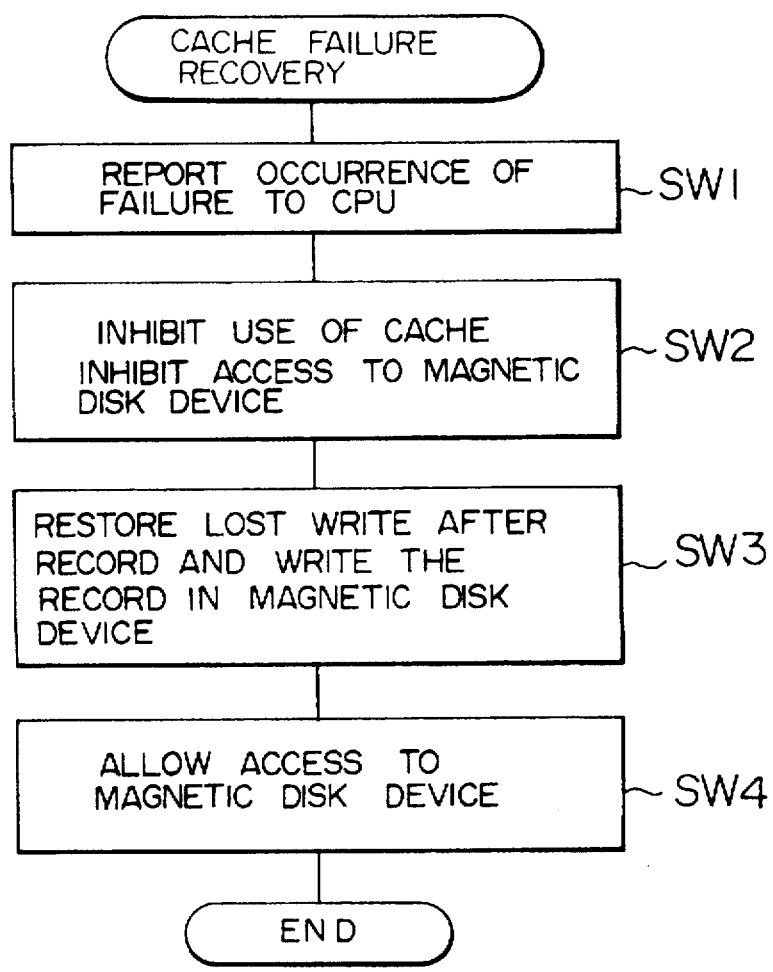
FIG. 12 is a flowchart of the operation at a cache failure.

The operation will now be described by reference to the flowchart of FIG. 12.

In a step SW1, the unit 21 recognizes occurrence of a failure in the cache 25 and then reports the condition and the contents of the failure via the high-order interface control circuit 21 to the CPU 10. The failure contents include information of a range of the cache 25 related to the failure and the oldest update generation identifier 94 of the table 52.

In a step SW2, the CPU initiates the cache failure recovery program to instruct the cache controller for inhibition of use of the cache 25. According to the instruction, the program 15 is inhibited from accessing records in the disk device 30 in an ordinary mode.

In a step SW3, the CPU 10 accesses the journal file 40 to sequentially read therefrom update journals beginning from a CP journal having a CP identifier matching the oldest update generation identifier 94 so as to recover and write all records in the disk device 30.

For example, when the identifier 94 is G(i+1), the record recovery is accomplished through processing I to VI as follows.

Processing I: The CPU 10 reads the update journal 46 from the journal file 40. The journal 46 contains update information of a record C.

Processing II: Since records of the disk device 30 cannot be accessed in the ordinary mode, the CPU 10 specifies a special mode to instruct the cache controller 20 to read the record C corresponding to the update journal 46 from the disk device 30.

Processing III: The controller 20 reads the record C from the disk device 30 through the control circuits 23, 24, and 22 without using the cache 25 and then transfers the record C to the CPU 10.

Processing IV: The CPU 10 updates the record C according to information of the journal 46 and then specifies a special mode to instruct the cache controller 20 to write the record C in the disk device 30.

In this regard, when the contents of records are completely written in the journal 46, the processing II and III may be skipped.

Processing V: The cache controller 20 writes the record C in the disk device 30 via the control circuits 22, 24, and 23 without using the cache 25.

Processing VI: The processing I to V is repeatedly conducted also for each of the update journal 47 and subsequent journals.

Referring again to FIG. 12, in a step SW4, the CPU 10 instructs the cache controller 20, which is still kept remaining in the use inhibition state, to allow an access to the disk device 30 in the ordinary mode. As a result, although the cache 25 is prevented from being used, the usual operation can be restarted.

Thereafter, when the failure is recovered in the cache 25, the cache 25 is released from the access inhibition state.

In the description, the record recovery is carried out for all records associated with the update journals beginning from a CP journal having a CP identifier matching the oldest update generation identifier 94. However, when the contents of the write-back record management table 51 of the directory 26 are kept, the record recovery need be carried out only for the records controlled as the write after records. Namely, all records are not required to be recovered. In this situation, furthermore, it is not necessitated to inhibit all accesses to the disk device 30 in the ordinary mode. That is, the access is required to be inhibited only for records managed as the write after records.

In addition, the operation above is also applicable to a partial failure of the cache 25. The recovery is to be achieved only for records stored as write after records in the failed portion thereof. Moreover, it is necessary to inhibit the access only to these records in the device 30 in the ordinary mode.

According to the first embodiment, in the operation to store write-back records in the magnetic disk device 30, the overhead time of the write operation can be minimized, thereby increasing the record write speed. Moreover, at a failure of the cache memory, write-back records lost in the cache memory due to the failure can be recovered in a short period of time.

Next, description will be given of advantageous effect developed by the cache controller 20 of the first embodiment.

It is assumed that the following premises I to VII are satisfied in the operation.

Premise I: The frequency of input/output requests is 30 (requests per second) for each magnetic disk device. This includes the frequency of output requests=10 (requests per second) and the frequency of creation of new write after record=5 (records per second). Moreover, it is assumed that there is employed random access patterns and the input/output requests occur uniformly with respect to time.

Premise II: The cache controller handles the write after processing in a constant manner. Namely, in a usual case, the controller stores write after records in the disk device as many as there are generated the new write-back records.

Premise III: Assume that the total number of write after records per magnetic disk is 1000 (records) in the cache.

Premise IV: In the ordinary operation, the write-back records are written in the device 30 in a random order with respect to the write sequence thereof in the cache 25.

Premise V: At a checkpoint, the period of time necessitated to store a write-back record in the device 30 is twice that required to write the record therein in the ordinary state.

Premise VI: The period of time to recover write after records lost due to a cache memory failure is equal to that necessitated to input update journals from the journal file. The journal input speed is 1500 journals per second.

Premise VII: The cache controller 20 is connected to 30 magnetic disk devices 30.

Under the premises, computations are achieved as follows to obtain the overhead time and the recovery time of cache failure at the checkpoint, wherein:

R stands for the number of write after records in the cache;

p indicates the number of write after records generated for each update generation; and A(j) designates the number of write-back records waiting for a write operation thereof in the disk device at occurrence of a j-th write-back record, j denoting the number of occurrences of write-back record counted from the beginning of a generation.

A(0)=0
A(1)=1
For a general value of j (j>p), $$A(j)=A(j-1)+1-a(j-1)/R(1 \leq j \leq p) \quad (1)$$

$$A(j)=A(j-1)-A(j-1)/R(j>P) \quad (2)$$

From the expressions (1) and (2), $$A(j)=R\{(1-1/R)^{}(j-p)-(1-1/R)^{}j\}(j \geq p)$$

In the expression, $(1-1/R)^{**}n$ indicates an n-th power of $(1-1/R)$.

Under these conditions, assuming that the checkpoint is set for every 36,000 output requests and the effective management generation number is five, the values of R and p are obtained as R=1000×30=30000 and p=36000×(5/10)=18000. Moreover, assuming j=18000×5=90000 (for five generations), the number of write-back records which are waiting for a operation in the disk device at each checkpoint and which have a generation advanced by five generations is attained as A(j)=1228.

In short, of the 18000 write-back records of each update generation, 1228 write-back records are required to be written in the disk device at the checkpoint. Consequently, in the write operation of write-back records in the disk device, the overhead is increased by about 7% (=1228/18000×100). In this case, the interval between checkpoints is two minutes.

On the other hand, in the recovery processing of a cache failure, it is necessary to achieve input operations of update journals of five generations for each of the 30 magnetic disk devices.

In consequence, the period of time required for the recovery processing is as follows.

36000×5/1500=120 (seconds)

Slightly minimizing the checkpoint interval such that a checkpoint is set for every 24,000 output requests, the values of p and j are p=12000
j=60000 and hence the increase in the overhead is about 17% and the recovery processing time is 80 seconds.

According to the known recovery method of the prior art employing the backup of the magnetic disk device and the update journals, although the overhead does not particularly take place, a long period of time is necessitated for the recovery processing. Namely, when the backup operation is to be daily carried out, it is necessary for the recovery to input update journals of half a day on average and hence about two hours are necessary for the recovery processing.

Moreover, according to a method in which there is not disposed any checkpoint such that the oldest write-back data (update data not written in the magnetic disk device) in the cache is memorized so as to determine, at a cache failure, a range of update journals necessary for the failure recovery processing, the overhead does not appear as in the prior art at the checkpoint and the recovery time is minimized when compared with the conventional method.

However, there is not conducted the write operation to preferentially store, at a checkpoint or the like, the old write-back data from the cache in the disk device, and hence the mean value of the period of time required for the recovery processing at a cache failure becomes to be several times that necessitated by the method in accordance with the present invention. Particularly, considerably old write-back data may exist in the cache depending on access patterns. In such a case, the recovery processing time is lengthened even more.

In addition, according to a method in which when a logical processing unit such as a program is finished, write-back records are written according to the processing unit in the magnetic disk device, the number of write-back records to be stored in the disk device at the end of processing unit is increased.

Resultantly, the overhead associated with the write operation of the write-back records in the disk device is increased by several tens of percent, which leads to deterioration of the efficiency of input/output processing of the magnetic disk device.

Furthermore, according to a method in which all write-back records are written in the magnetic disk device at a checkpoint, the record write operation takes about several minutes. This consequently necessitates the checkpoint interval to be from one hour to several hours. As a result, the failure recovery processing consumes from ten-odd minutes to several tens of minutes.

In the method of the embodiment above, the overhead of the write processing of write-back records in the disk device is increased by about several percent as above and hence the recovery time of the cache failure can be several seconds or less. The increase in the overhead is sufficiently small in consideration of the ratio of the write-back processing to the overall input/output processing of the magnetic disk device and hence rarely adversely influences the performance efficiency thereof.

Figure 13:
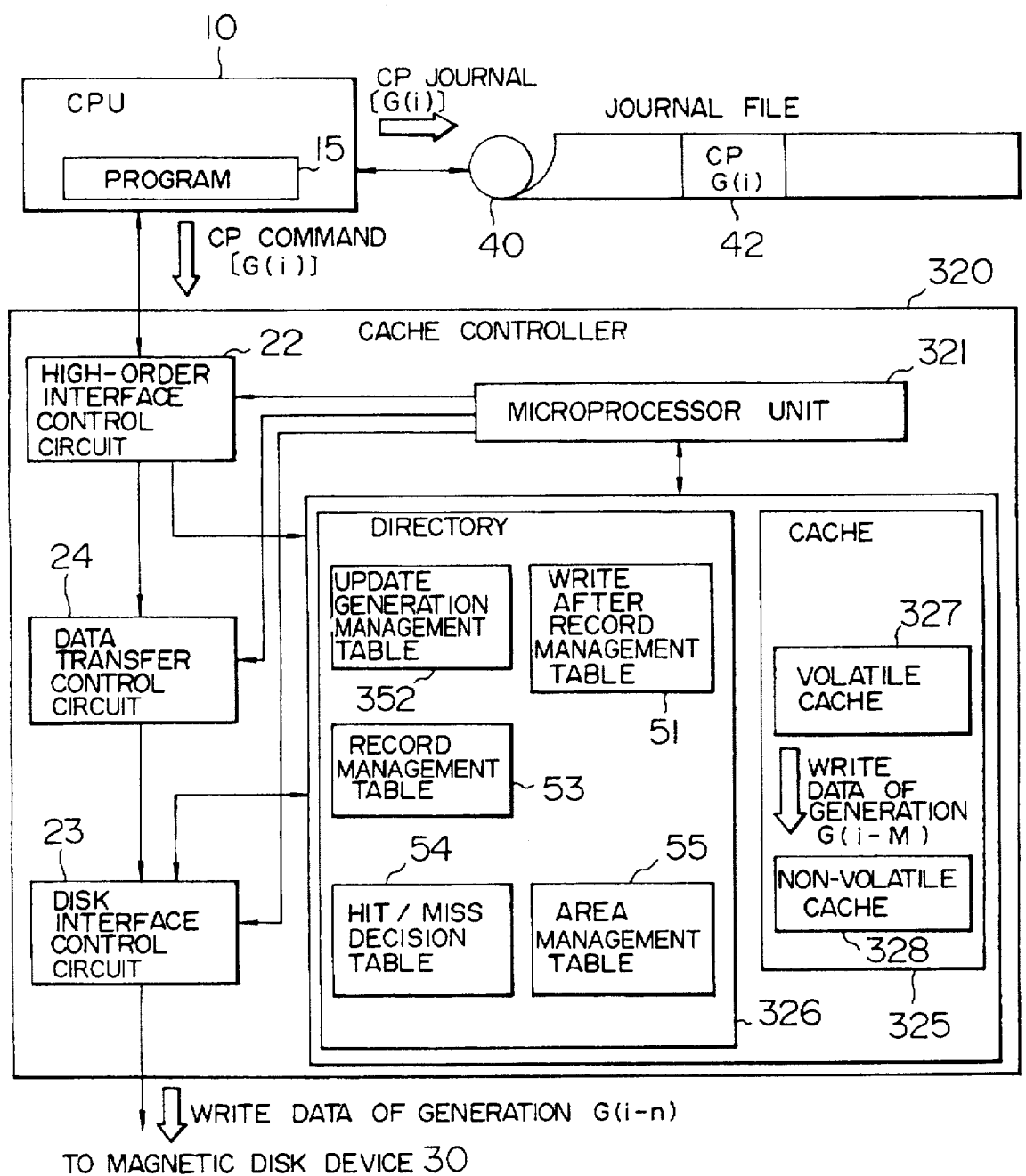
FIG. 13 is a block diagram showing a cache controller in a second embodiment according to the present invention.

FIG. 13 is a block diagram showing a cache controller 320 in a second embodiment according to the present invention. The controller 320 is different from the controller 20 of the first embodiment in (1) the configuration of a cache 325, (2) the constitution of an update generation management table 352, and (3) operation of a microprocessor 321 at a checkpoint.

The cache 325 is formed of, for example, a volatile cache 327 and a non-volatile cache 328. The cache 328 is a semiconductor memory supported by a battery.

Figure 14:
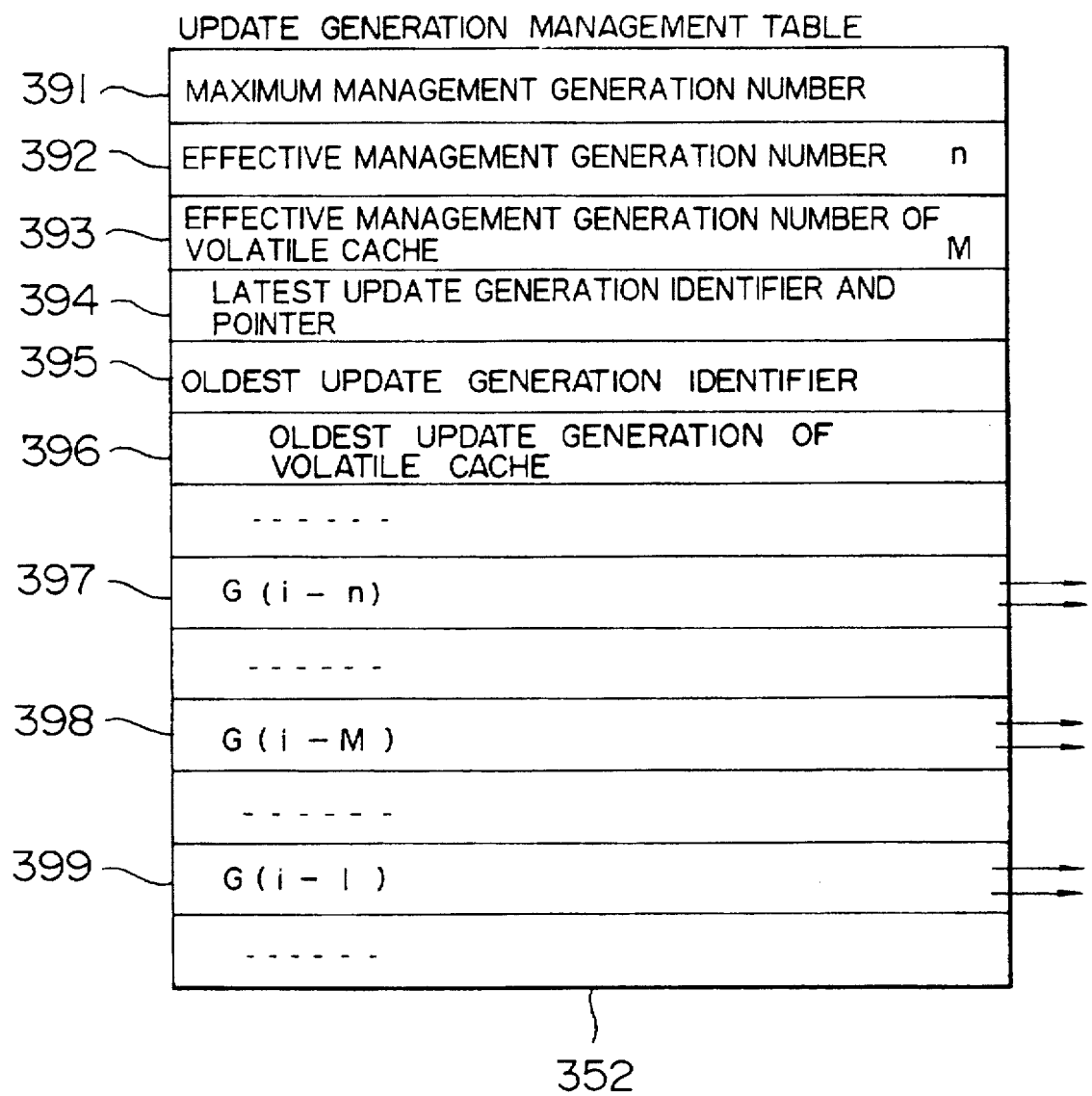
FIG. 14 is a diagram showing the structure of an update generation management table in the second embodiment.

The table 352 includes, as shown in FIG. 14, a maximum management generation number 391, an effective management generation number 392, an effective management generation number of volatile cache 393, a latest update generation identifier and pointer 394, an oldest update generation identifier 395, an oldest update generation identifier of volatile cache 396, and entries 397, 398, etc. to store therein an update generation identifier and the like.

The number 391 indicates the maximum value of update generation number manageable by the table 352. The number 392 denotes the update generation number actually supervised by the table 352. This value is set to "n" in this example. The number 393 designates the update generation number managed by the volatile cache 327 and is set to "M" (<n) in this embodiment. The value M is specified by the CPU 10 in a process of setting the utilization mode of the cache 325 when the online database program is started for execution thereof.

The identifier and pointer 394 includes an identifier of the latest update generation at the point of time and an entry storing therein the identifier. The identifier 395 denotes the oldest update generation at the point. The identifier 396 designates the oldest update generation managed by the cache 327.

Entries 397, 398, etc. are configured in the same manner as for the entry 96 of FIG. 4.

Next, operation of the construction will be briefly described.

The CPU 10 records, when updating a record in the disk device in an execution process of the database program, update journals in the journal file 40. Moreover, at a checkpoint, the CPU 10 writes a CP journal in the file 40 and issues a CP command to the cache controller 320.

The controller 320 first stores a write after record in the volatile cache 327 and then updates the write-back record management table 51 according to information of write-back record generated. In addition, a CP identifier contained in the received CP command is stored as an update generation identifier in an entry of the table 352. Moreover, according to information of write after records generated up to when a subsequent CP command is received thereafter, the controller 320 registers entries thereof to the table 352.

In addition, on receiving a CP command, the cache controller 320 attempts to retrieve a write-back record associated with an update generation G(x−n) which is older by n generations relative to the update generation G(x) corresponding to the CP command. If the record is obtained, the controller 320 writes the record in the disk device 30. For example, assuming that the CP command contains a CP identifier designated as G(i), the controller 320 seeks for a write-back record for an update generation G(i−n). If the record is detected, the controller 320 stores the record in the device 30 and then sets G(i−n+1) to the oldest update generation identifier 395.

Subsequently, the controller 320 tries to retrieve a write-back record of an update generation G(x−M) advanced in time with respect to the update generation G(x) of the CP command. If the record is attained, the controller 320 moves the record from the cache 327 to the non-volatile cache 328. For example, when the CP command contains a CP identifier indicated as G(i), the controller 320 searches for a write-back record for an update generation G(i−M). If the record is detected, the controller 320 moves the record from the volatile cache 327 to the non-volatile cache 328 and thereafter stores G(i−M+1) to the oldest update generation identifier of volatile cache 396.

At occurrence of a failure, when a write after record is lost in the cache 325, the controller 320 sends failure information notifying the condition, a range of failure, etc. to the CPU 10. In addition, in a case of a failure of the overall cache 325 or the non-volatile cache 328, the oldest update generation identifier 395 stored in the table 352 is reported to the CPU 10. On the other hand, for a failure of the volatile cache 327, the identifier 396 stored in the table 352 is sent to the CPU 10.

On receiving the report, the CPU 10 interrupts execution of the database program and then initiates the cache failure recovery sub-program. According to the recovery program, the CPU 10 accesses the journal file 40 to read therefrom update journals beginning from an update journal associated with the identifier 395 or 396 and thereby recovers the write-back record according to records in the disk device 30.

Through the operation above, by tracing the journal file 40 in the reverse direction for "n" or "M" generations, there can be recovered the write-back record lost in the cache 325.

In this connection, assume that the write after record is to be copied from the volatile cache 327 onto the non-volatile cache 328, namely, a copy of records is to be achieved in place of the move thereof. In this case, at occurrence of a failure in the cache 328, the recovery processing is not required for any write-back record kept remained in the cache 327, thereby continuing the processing.

Next, detailed description will be given of (1) operation at initialization of cache controller, (2) operation to initiate execution of online database program, (3) operation to update data, (4) operation of write after processing, (5) operation at checkpoint, and (6) operation at cache failure.

(1) Operation at initialization of cache controller

The CPU 10 carries out, in addition to operations similar to those of the first embodiment, an operation to transmit an initial value "M0" of the effective management generation number of the volatile cache to the controller 320. The controller 320 then initializes the number 393 of the table 352 to the value "M0". Moreover, the oldest update generation identifier of volatile cache 396 is initialized to a null value.

(2) Operation to initiate execution of online database program

The CPU 10 conducts, in addition to operations similar to those of the first embodiment, an operation to supply the controller 320 with end the effective management generation number "M" of the volatile cache in the CP command specified for initialization. The controller 320 then sets the received number "M" to the number 393 of the table 352. Moreover, the identifier 396 is set to G(0).

(3) Operation to update data

This operation is similar to that accomplished in the first embodiment, excepting that a new write-back record is stored in the volatile cache 327.

(4) Operation of write-back processing

This operation is similar to that accomplished in the first embodiment.

(5) Operation at checkpoint

FIG. 13 shows a state of operation at a checkpoint.

On arriving at a checkpoint in an execution process of a program 15, the CPU 10 issues a CP command to the controller 320 and records a CP journal in the journal file 40. For example, at a checkpoint of a CP identifier G(i), the CPU 10 sends a CP command containing the CP identifier G(i) to the controller 320 and writes a CP journal 42 having the CP identifier G(i) in the journal file 42.

Figure 15:
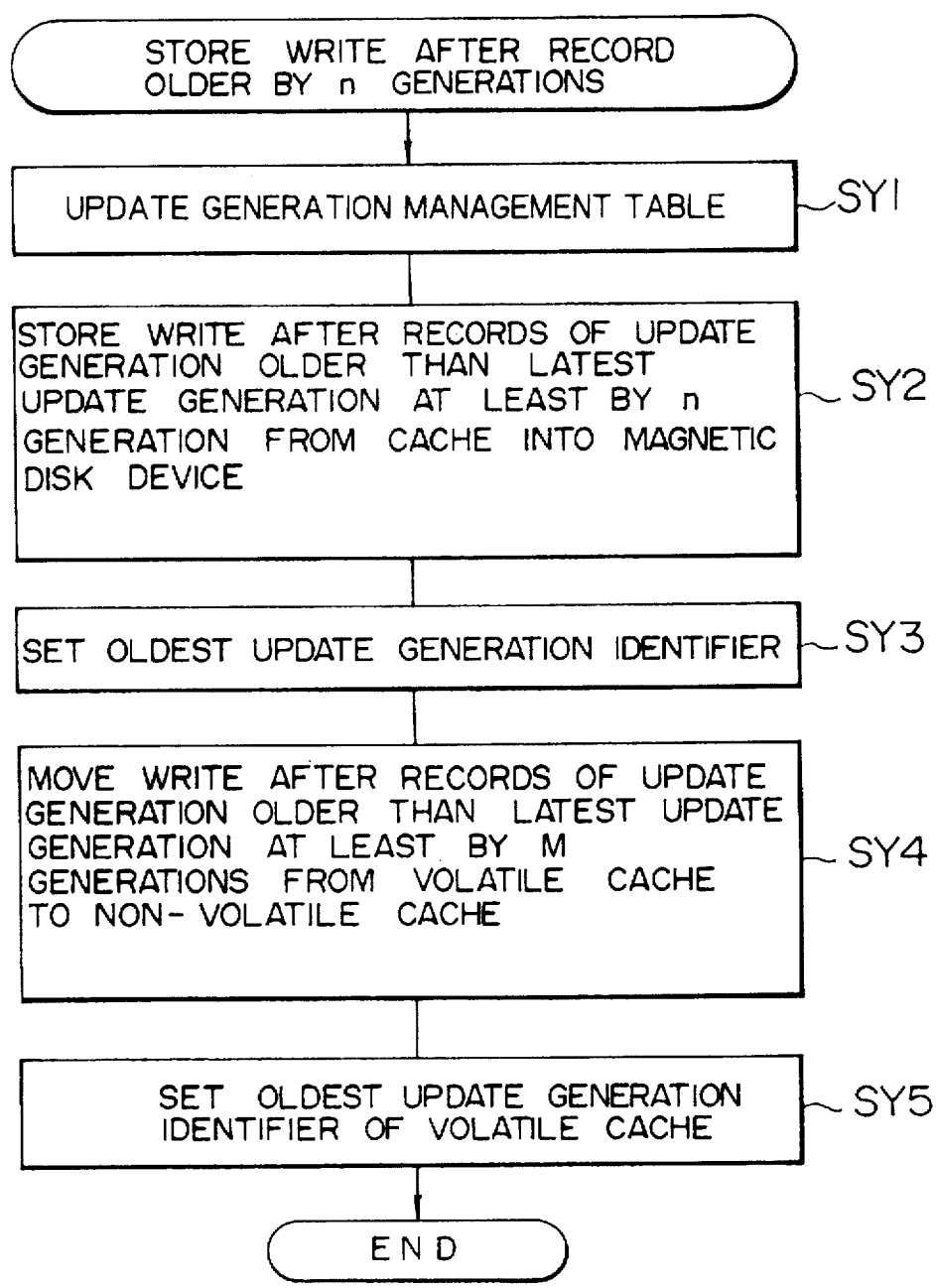
FIG. 15 is a flowchart showing the operation to store write-back data advanced in time by n generations in the second embodiment.

Referring next to the flowchart of FIG. 15, operation of the controller 320 at reception of a CP command from the CPU 10 will be described by reference to an example of a CP command containing the CP identifier G(i).

In a step SY1, the high-level interface control circuit 22 transfers to the microprocessor 321 the CP command of the CP identifier G(i) received from the CPU 10.

The microprocessor 321 updates the table 352 in the directory 326 to set the CP identifier G(i) as the latest generation identifier. Namely, an entry of the update generation G(i) is registered to a position next to an entry 399 of the previous update generation G(i−1). Moreover, the unit 321 sets G(i) and a pointer to the entry of the update generation G(i) to the field of identifier and pointer 394.

In a step SY2, the unit 321 references the number 392 in the table 352 to acquire a value "n" and then writes in the disk device 30 a write-back record having an update generation G(i−n) advanced in time by n generations relative to the latest update generation G(i).

In a step SY3, the unit 321 sets G(i−n+1) to the oldest update generation identifier 395.

In a step SY4, the microprocessor 321 references the number 393 in the table 352 to obtain a value "M" and then moves a write-back record having an update generation G(i−M) which is older by M generations than the latest update generation G(i) from the volatile cache 327 to the non-volatile cache 328.

In a step SY5, the unit 321 sets G(i−M+1) as the identifier 396.

In this regard, when free areas exist in the non-volatile cache 328, the steps SY2 and SY4 can be concurrently executed.

(6) Operation at cache failure

The system accomplishes operation similar to that of the first embodiment. However, as above, the range of update journals to be traced in the reverse direction for the recovery of the write-back record is n generations for a failure of the overall system of the cache 325 or a failure of only the non-volatile cache 328 and M generations for a failure of only the volatile cache 327.

According to the second embodiment, since a case where a write-back record is lost only in the cache 327 at a failure such as a power interruption occurs with a higher possibility, it is only necessary in many cases to trace M generations of update journals. The value M is less than the value n and hence the write-back record can be recovered in a shorter period of time when compared with the first embodiment.

In the first and second embodiments, the online database program is employed to record the update journal. However, any other program such as a data management program of an operating system may be used for this purpose.

Furthermore, in the first and second embodiments, at a cache failure, the oldest update generation and the oldest update generation of volatile cache are reported respectively from the cache controllers 20 and 30 to the CPU 10. However, the same report operations may be accomplished at a checkpoint.

In addition, according to the first and second embodiments, when data is updated in the disk device 30, an update journal is written in the journal file 40. However, if there is adopted a program which can identify at a checkpoint a last position where the program execution is achieved and in which an identical result is attained by executing again the same processing beforehand executed, the update journal need not be recorded. In this case, at a cache failure, the program is executed again beginning from a position thereof associated with the pertinent checkpoint, thereby recovering the write-back record lost. Particularly, in the second embodiment, when a write-back record is lost in the volatile cache 327 due to a failure, it is only necessary to execute again the program from a point thereof corresponding to a checkpoint associated with the oldest update generation identifier of volatile cache 396, thereby restoring the missing write-back record.

Moreover, according to the first and second embodiments, pointer chains of the update generation management tables 52 and 352 and the write after record management table 51 are used to manage update generations of write-back records in the cache devices 25 and 325. However, to manage the update generations, there may be employed bit maps for the respective records in the cache devices 25 and 325. That is, to manage the update generations above, there may be used a bit map indicating whether or not each record is a write-back record and a plurality of bit maps denoting update generations of the record.

Furthermore, in the first and second embodiments, write-back data of older than the effective management generation number is written from the cache into the disk device at a checkpoint. However, the write operation may be achieved in the ordinary write after processing. Namely, the cache controller preferentially writes in the disk device the write-back data having a generation older than the effective management generation.

In addition, according to the first and second embodiments, the cache device 25 and the cache controllers 20 and 320 are integrally configured with the control circuits of the magnetic disk device 30. However, the present invention is applicable to a case where these control circuits are disposed on the side of the CPU 10. That is, the main storage or an extended unit thereof may be employed as the cache such that the cache is controlled by a program operating under control of the CPU 10 or by a unit added to the CPU 10.

While particular embodiments of the invention have been shown and described, it will be obvious to those skilled in the art that various changes and modifications may be made without departing from the present invention in its broader aspects.

I claim:

1. A method of controlling a cache in a computer system which includes a central processing unit (CPU), a direct access storage device, a cache disposed between the CPU and the storage device for temporarily storing therein a record transferred between the CPU and the storage device, a cache controller for controlling the cache, and a program executed by the CPU and issuing record update requests for the storage device, comprising the steps of:

issuing from the CPU executing the program a checkpoint request with a checkpoint identifier to the cache controller;

generating by the cache controller, in response to the checkpoint request issued by the CPU, an update generation identifier corresponding to the checkpoint identifier of the checkpoint request and indicating when an update record in the cache to be written into the storage device is first written into the cache in response to an update request issued by the CPU;

writing by the cache controller an update record into the cache in response to the update request issued by the CPU;

notifying by the cache controller completion of the write operation to the CPU when the update record is written into the cache; and writing by the cache controller the update record in the cache into the storage device, wherein the step of writing the update record into the cache includes the step of recording the update generation identifier generated at the last checkpoint with the update record as the update generation identifier of the update record if the update generation identifier of the undated record is not recorded, and the step of writing the update record in the cache into the storage device includes the step of deciding an order of writing the update record into the storage device based on the update generation identifier of the update record.

2. A method according to claim 1, wherein the step of writing the update record in the cache into the storage device includes the step of:

storing in a non-volatile memory the generation identifier of the update record in the cache whose update generation identifier is generated prior to the generation of the update generation identifier of any other update record in the cache.

3. A method according to claim 2, further comprising the step of:

specifying by the CPU an effective management generation number n indicating a number of update generation of the update record in the cache managed by the cache controller;

wherein the step of writing the update record in the cache into the storage device preferentially writes into the storage device the update record stored in the cache.

wherein the record has an update generation identifier prior to a newest update generation identifier by the effective management generation number n.

4. A method according to claim 2, further comprising the step of:

establishing at the checkpoint a correspondence between an execution position of the program executed by the CPU and the update generation identifier.

5. A method according to claim 4, further comprising the step of:

executing again the program, when update records in the cache are lost due to a failure from the program execution position corresponding to the update generation identifier stored in the non-volatile memory, thereby recovering the write after data.

6. A method according to claim 2, wherein the computer system includes a journal file, and the method further comprises the steps of:

recording, by the CPU, when the program updates a record in the storage device, an update journal including update contents of the record in the journal file; and establishing by the CPU at the checkpoint a correspondence between a recording position of the journal file and the update generation identifier.

7. A method of controlling a cache in a computer system which includes a central processing unit (CPU), a direct access storage device, a cache disposed between the CPU and the storage device for temporarily storing therein a record transferred between the CPU and the storage device, a cache controller for controlling the cache, and a program executed by the CPU and issuing record update requests for the storage device, comprising the steps of:

issuing from the CPU executing the program a checkpoint request with a checkpoint identifier to the cache controller;

generating by the cache controller, in response to the checkpoint request issued by the CPU, an update generation identifier corresponding to the checkpoint identifier of the checkpoint request and indicating when an update record in the cache to be written into the storage device is first written into the cache in response to an update request issued by the CPU;

writing by the cache controller an update record into the cache in response to the update request issued by the CPU;

notifying by the cache controller completion of the write operation to the CPU when the update record is written into the cache; and writing by the cache controller the update record in the cache into the storage device, wherein the step of writing the update record into the cache includes the step of recording the update generation identifier generated at the last checkpoint with the update record as the update generation identifier of the update record if the update generation identifier of the updated record is not recorded, and the step of writing the update record in the cache into the storage device includes the step of deciding an order of writing the update record into the storage device based on the update generation identifier of the update record;

wherein the step of writing the update record in the cache into the storage device further includes the step of:

storing in a non-volatile memory the generation identifier of the update record in the cache whose update generation identifier is generated prior to the generation of the update generation identifier of any other update record in the cache;

wherein the computer system includes a journal file, and the method further comprises the steps of:

recording, by the CPU, when the program updates a record in the storage device, an update journal including update contents of the record in the journal file;

establishing by the CPU at the checkpoint a correspondence between a recording position of the journal file and the update generation identifier;

blocking, by the CPU, when update records in the cache are lost due to a failure, the storage device as a destination of a write operation of the update record;

detecting by the CPU the recording position in the journal file associated with the update generation identifier stored in the non-volatile memory;

recovering by the CPU the lost update records in the cache according to update journals following the recording position; and releasing by the CPU the blocked state of the storage device.

8. A method according to claim 7, wherein the step of recovering the lost update records in the cache comprises the steps of:

reading from the journal file update journals beginning from the recording position;

reading a desired record of the update journals from the blocked storage device;

recovering the lost update records in the cache according to the record read from the blocked storage device and the update journals; and writing the recovered update records in the storage device.

9. A method of controlling a cache in a computer system which includes a central processing unit (CPU), a direct access storage device, a cache disposed between the CPU and the storage device for temporarily storing therein a record transferred between the CPU and the direct access storage device, a cache controller for controlling the cache, a storage device for storing therein a journal file, and a program executed by the CPU and issuing record update requests for the storage requests, comprising the steps of:

specifying by the CPU an effective management generation number n indicating a number of update generation of the update record in the cache managed by the cache controller;

recording by the CPU a checkpoint journal including the checkpoint identifier in the journal file at a plurality of points during execution of the program;

issuing by the CPU executing the program a checkpoint request with the checkpoint identifier to the cache controller at the plurality of points during execution of the program;

generating by the cache controller, in response to the checkpoint request issued by the CPU, an update generation identifier corresponding to the checkpoint identifier of the checkpoint request and indicating when an update record in the cache to be written into the storage device is first written into the cache in response to an update request issued by the CPU;

recording, by the CPU, when the program updates a record in the storage device, an update journal including update contents of the record in the journal file;

writing by the cache controller an update record into the cache in response to the update request issued by the CPU;

notifying by the cache controller completion of the write operation to the CPU when the update record is written into the cache;

writing by the cache controller the update record in the cache into the storage device, wherein the step of writing the update record into the cache includes the step of recording the update generation identifier generated at the last checkpoint into the update record as the update generation identifier of the update record if the update generation identifier of the updated record is not recorded, and wherein the step of writing the update record into the storage device preferentially writes the update record in the cache into the storage device, the record having an update generation identifier prior to a newest update generation identifier by the effective management generation number n; and storing in a non-volatile memory the update generation identifier of the update record in the cache whose update generation identifier is generated prior to the generation of the update generation identifier of any other update record in the cache.

10. A method according to claim 9, further comprising the steps of:

blocking, by the CPU, when update records in the cache are lost due to a failure, the direct access storage device as a destination of a write operation of the update record;

reading by the CPU the journal file;

detecting by the CPU the checkpoint journal including the checkpoint of the identifier corresponding to the update generation identifier stored in the non-volatile memory;

recovering by the CPU the lost update records in the cache, the recovering step including the steps of:

reading from the journal file update journals beginning from the checkpoint journal thus detected, reading a record associated with the update journal from the blocked direct access storage device, recovering the lost update records in the cache according to the record read from the blocked direct access storage device and the update journals, and writing the recovered update records in the direct access storage device; and releasing by the CPU the blocked state of the direct access storage device.

11. A cache controller for controlling a cache in a computer system which includes a central processing unit (CPU), a direct access storage device, a cache disposed between the CPU and the storage device for temporarily storing therein record transferred between the CPU and the storage device, a cache controller for controlling the cache, and a program executed by the CPU and issuing record update requests for the storage device, comprising:

said CPU issuing a checkpoint request with a checkpoint identifier;

update generation control means for generating in response to the checkpoint request issued by the CPU, an update generation identifier corresponding to the checkpoint identifier of the checkpoint request and indicating when an update record in the cache to be written into the storage device is first written into the cache in response to an update request issued by the CPU;

write after data control means for writing an update record into the cache in response to the update request issued by the CPU and notifying completion of the write operation to the CPU when the update record is written into the cache; and wherein said update generation control means includes means for recording the update generation identifier generated at the last checkpoint with the update record as the update generation identifier of the update record if the update generation identifier of the updated record is not recorded; and destaging means for writing the update record in the cache into the storage device, wherein said destaging means includes means for deciding an order of writing the update record into the storage device based on the update generation identifier of the update record.

12. A cache controller according to claim 11, further comprising:

effective generation number management means for specifying an effective management generation number n indicating a number of update generation of the update record in the cache managed by the cache controller;

wherein said destaging means preferentially writes in the storage device the update record, wherein the record has an update generation identifier prior to a newest update generation identifier by the effective management generation number n.

13. A cache controller according to claim 12, wherein the destaging means reports, after writing the update record in the cache into the storage device, completion of destaging to the CPU.

14. A cache controller according to claim 11, wherein the update generation management means includes:

means operative at a predetermined point of time for storing in a non-volatile memory the update generation identifier of the update record in the cache whose update generation identifier is generated prior to the generation of the update generation identifier of any other update record in the cache.

15. A cache controller according to claim 11, wherein the cache includes a volatile cache formed in a volatile memory and a non-volatile cache disposed in a non-volatile memory.

16. A cache controller according to claim 15, further comprising:

volatile cache effective generation number management means for specifying an effective management generation number of volatile cache M indicating a number of update generation of the update record in the cache managed by the cache controller;

wherein said destaging means includes intra-cache backup means for writing the update record from the volatile cache into the non-volatile cache, wherein the record has an update generation identifier prior to a newest update generation identifier by the effective management generation number of volatile cache M.

* * * * *